United States Patent
Zhou et al.

(10) Patent No.: US 9,684,814 B2
(45) Date of Patent: Jun. 20, 2017

(54) METHOD AND DEVICE FOR ESTIMATING ORIENTATION FIELD OF FINGERPRINT

(71) Applicant: Tsinghua University, Beijing (CN)

(72) Inventors: Jie Zhou, Beijing (CN); Jianjiang Feng, Beijing (CN); Xiao Yang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 236 days.

(21) Appl. No.: 14/400,416

(22) PCT Filed: Apr. 10, 2014

(86) PCT No.: PCT/CN2014/075085
§ 371 (c)(1),
(2) Date: Nov. 11, 2014

(87) PCT Pub. No.: WO2015/089960
PCT Pub. Date: Jun. 25, 2015

(65) Prior Publication Data
US 2016/0275330 A1    Sep. 22, 2016

(30) Foreign Application Priority Data

Dec. 19, 2013  (CN) .......................... 2013 1 0703526

(51) Int. Cl.
*G06K 9/00* (2006.01)
*G06K 9/46* (2006.01)
*G06K 9/62* (2006.01)

(52) U.S. Cl.
CPC .......... *G06K 9/001* (2013.01); *G06K 9/0008* (2013.01); *G06K 9/00013* (2013.01); *G06K 9/6215* (2013.01)

(58) Field of Classification Search
USPC ................................. 382/124, 190
See application file for complete search history.

(56) References Cited

U.S. PATENT DOCUMENTS

| | | | |
|---|---|---|---|
| 2004/0151352 A1* | 8/2004 | Nakajima ......... | G06K 9/00087 382/124 |
| 2007/0047785 A1* | 3/2007 | Jang .................... | G06K 9/0008 382/125 |

(Continued)

FOREIGN PATENT DOCUMENTS

CN          103646238 A        3/2014

OTHER PUBLICATIONS

PCT International Search Report mailed on Sep. 24, 2014.

*Primary Examiner* — Kathleen Y Dulaney
(74) *Attorney, Agent, or Firm* — Kile Park Reed & Houtteman LLC

(57) ABSTRACT

A method for estimating an orientation field of a fingerprint is provided, comprising: obtaining an initial orientation field of a fingerprint, and putting the initial orientation field in a reference coordinate system; obtaining N initial orientation blocks corresponding to the initial orientation field, and obtaining N orientation block sets corresponding to N positions respectively from a fingerprint dictionary; obtaining a similarity between each of the N initial orientation blocks and each orientation block in the N orientation block sets corresponding to the N positions to obtain P similarities, and selecting a preset number of candidate orientation blocks for each position from the orientation block set according to the P similarities; obtaining a compatibility between two candidate orientation blocks corresponding to any two adjacent positions respectively to obtain a plurality of compatibilities; and obtaining a candidate orientation block for each position according to the P similarities and the plurality of compatibilities.

16 Claims, 8 Drawing Sheets

(56) References Cited

U.S. PATENT DOCUMENTS

2013/0142405 A1\* 6/2013 Nada .................. G06K 9/001
                                                                          382/124
2015/0036896 A1\* 2/2015 Zhou ................. G06K 9/00067
                                                                          382/124

\* cited by examiner

METHOD AND DEVICE FOR ESTIMATING ORIENTATION FIELD OF FINGERPRINT

CROSS-REFERENCE TO RELATED APPLICATION

This application claims priority to and benefits of Chinese Patent Application Serial No. 201310703526.1, filed with the State Intellectual Property Office of P. R. China on Dec. 19, 2013, the entire content of which is incorporated herein by reference.

FIELD

Embodiments of the present disclosure generally relate to a fingerprint identification technology field, and more particularly to a method and a device for estimating an orientation field of a fingerprint.

BACKGROUND

The fingerprint identification technology has been widely used in various fields, including crime investigation, physical and logical access control, time and attendance. The key technology of fingerprint identification is to estimate an orientation field of a fingerprint. In practical applications, the collected fingerprint images may have very complicated background textures (such as fingerprint images collected from a crime scene using chemical agents or optical instrument in the crime investigation), or the fingerprint images may have poor quality of the fingerprint ridge.

In the prior art, the initial orientation field of the fingerprint can be estimated according to local characteristics of the fingerprint image, and then can be optimized by the smoothness constraint of the fingerprint ridge. Such method has a good performance when the quality of the fingerprint image is high and the background of the fingerprint image is clean enough. However, such method does not work when the fingerprint image has a strong interference of the background texture or has a poor image quality.

As it is unable to ensure the accuracy of the initial orientation field, it is difficult to enhance and match with the initial orientation field of the fingerprint, and totally misleading results will be generated. In this case, the characteristics of the fingerprint image should be manually extracted, and the extracted characteristics should be manually matched with characteristics of fingerprint in the fingerprint base to obtain the orientation field of the fingerprint. This requires highly intensive human work, which is very complicated and time-consuming, and low in efficiency.

Moreover, as the conventional method for estimating the orientation field of the fingerprint only considers statistical information of fingerprint image blocks and the smoothness constraint of the fingerprint ridge, it has following disadvantages. Firstly, in the case of complicated background, it is difficult to distinguish whether an estimated initial orientation field relates to the background or to the fingerprint image if only the statistical information of the fingerprint image blocks is considered. Secondly, although the smoothness of an estimated orientation field can be ensured, the correctness of the estimated orientation field cannot be ensured if only the smoothness constraint of the fingerprint ridge is considered.

SUMMARY

Embodiments of the present disclosure seek to solve at least one of the problems existing in the prior art to at least some extent.

According to embodiments of a first aspect of the present disclosure, a method for estimating an orientation field of a fingerprint is provided. The method comprises steps of: receiving a fingerprint to be estimated, obtaining an initial orientation field of the fingerprint to be estimated, and putting the initial orientation field in a reference coordinate system; obtaining N initial orientation blocks corresponding to the initial orientation field, in which the N initial orientation blocks correspond to N positions of the initial orientation field in the reference coordinate system respectively, and obtaining N orientation block sets corresponding to the N positions respectively from a fingerprint dictionary, in which the fingerprint dictionary comprises M orientation block sets corresponding to M positions in the reference coordinate system, and each of the M orientation block sets comprises a plurality of orientation blocks corresponding to a plurality of training fingerprints in one position of the M positions respectively and in which N≤M; obtaining a similarity between each of the N initial orientation blocks and each orientation block in the N orientation block sets corresponding to the N positions to obtain P similarities, and selecting a preset number of candidate orientation blocks for each of the N positions from the orientation block set according to the P similarities; obtaining a compatibility between two candidate orientation blocks corresponding to any two adjacent positions of the N positions respectively to obtain a plurality of compatibilities; and obtaining a candidate orientation block for each position from the preset number of candidate orientation blocks according to the P similarities and the plurality of compatibilities.

In one embodiment of the present disclosure, the fingerprint dictionary is established by: obtaining P training orientation fields corresponding to P training fingerprints respectively, and calibrating P reference points corresponding to the P training orientation fields respectively and P reference directions corresponding to the P training orientation fields respectively; adjusting the P training orientation fields to the reference coordinate system according to the P reference points and the P reference directions respectively, and obtaining P reference orientation fields corresponding to the P training fingerprints respectively; and obtaining the M orientation block sets according to the P reference orientation fields to establish the fingerprint dictionary.

In one embodiment of the present disclosure, obtaining the M orientation block sets according to the P reference orientation fields comprises: obtaining a first preset size orientation block corresponding to a position $(x_i, y_i)$ in each of the P reference orientation fields; judging whether the first preset size orientation block is in a valid region; if yes, putting the first preset size orientation block into a valid set $T(x_i, y_i)$ corresponding to the position $(x_i, y_i)$; and obtaining an orientation block set $D(x_i, y_i)$ corresponding to the position $(x_i, y_i)$ by clustering orientation blocks in the valid set $T(x_i, y_i)$.

In one embodiment of the present disclosure, clustering orientation blocks in the valid set $(x_i, y_i)$ comprises: a. putting any orientation block of the valid set $T(x_i, y_i)$ into the orientation block set $D(x_i, y_i)$; b. selecting another orientation block from the valid set $T(x_i, y_i)$, and obtaining a similarity between the another orientation block and each orientation block of the orientation block set $D(x_i, y_i)$ to obtain a first plurality of similarities; c. if each of the first plurality of similarities is less than a first preset value, putting the another orientation block into the orientation block set $D(x_i, y_i)$; d. if at least one of the first plurality of similarities is larger than or equal to the first preset value, abandoning the another orientation block; and e. repeating step b to d until all the orientation blocks of the valid set $T(x_i,y_i)$ have been selected.

In one embodiment of the present disclosure, obtaining an initial orientation field of the fingerprint to be estimated comprises: obtaining a foreground image of the fingerprint to be estimated; dividing the foreground image into a plurality of non-overlapping and second preset size image blocks; applying two-dimensional short-time Fourier transform to each of the plurality of non-overlapping and second preset size image blocks, and obtaining a plurality of response directions corresponding to the plurality of non-overlapping and second preset size image blocks respectively; establishing a foreground orientation field of the fingerprint to be estimated according to the plurality of response directions; and generating the initial orientation field of the fingerprint to be estimated by adjusting the foreground orientation field according to an adjusting algorithm for fingerprint attitude.

In one embodiment of the present disclosure, selecting preset number of candidate orientation blocks for each of the N positions from the orientation block set corresponding to the initial orientation block according to the P similarities comprises: f. obtaining an orientation block queue by sorting orientation blocks of the orientation block set $D(x_i,y_i)$ according to the similarities corresponding to the orientation blocks of the orientation block set $D(x_i,y_i)$, obtaining a maximum similarity of the similarities, and putting the orientation block corresponding to the maximum similarity into a candidate orientation block set; g. selecting an orientation block subsequent to the orientation block put into the candidate orientation block set from the orientation block queue, and obtaining a similarity between the orientation block subsequent to the orientation block put into the candidate orientation block set and each orientation block in the candidate orientation block set to obtain a second plurality of similarities; h. if each of the second plurality of similarities is less than a second preset value, putting the orientation block subsequent to the orientation block put into the candidate orientation block set into the candidate orientation block set; i. if at least one of the second plurality of similarities is larger than or equal to the second preset value, abandoning the orientation block subsequent to the orientation block put into the candidate orientation block set; and j. repeating step g to i until the number of the candidate orientation blocks in the candidate orientation block set is a preset number.

In one embodiment of the present disclosure, obtaining a candidate orientation block for each position from the preset number of candidate orientation blocks according to the P similarities and the plurality of compatibilities comprises: establishing an objective optimization function according to the P similarities and the plurality of compatibilities, and obtaining the candidate orientation block for each position by optimizing the objective optimization function, in which the objective optimization function is:

$$\min E(r) = \min \left( \sum_{i \in V} (1 - S(\Theta_i, \Phi_{i,r_i})) + w_c \sum_{(i,j) \in N} \left(1 - C(\Phi_{i,r_i}, \Phi_{j,r_j})\right) \right),$$

in which, V is the initial orientation field, i is a position $(x_i,y_i)$ in the initial orientation field V, $\Theta_i$ is an initial orientation block corresponding to the position $(x_i,y_i)$, $\Theta_{i,r_i}$ is an $r_i^{th}$ candidate orientation block corresponding to the position $(x_i,y_i)$, $S(\Theta_i,\Theta_{i,r_i})$ is the similarity between the initial orientation block $\Theta_i$ and the candidate orientation block $\Theta_{i,r_i}$, N is a set of four-connected adjacent initial orientation blocks, $\Theta_{j,r_j}$ is an $r_j^{th}$ candidate orientation block corresponding to a position $(x_j,y_j)$ adjacent to the position $(x_i,y_i)$, $C(\Theta_{i,r_i},\Theta_{j,r_j})$ is the compatibility between the candidate orientation block $\Theta_{i,r_i}$ and the candidate orientation block $\Theta_{j,r_j}$, $w_c$ is a preset weight.

In one embodiment of the present disclosure, the objective optimization function is optimized according to Graph Cut or confidence transmission method.

With the method according to embodiments of the present disclosure, the candidate orientation block for each position of the reference coordinate system is obtained according to the similarities between each of the N initial orientation blocks and each orientation block in the N orientation block sets, and the compatibilities between two candidate orientation blocks corresponding to any two adjacent positions of the N positions, and thus a rational orientation field of the fingerprint is estimated by global optimization. In addition, with the method according to embodiments of the present disclosure, the orientation field is quantized, pre-knowledge regarding a fingerprint ridge is effectively applied to the estimation of orientation field of the fingerprint, an interference of a complicate background is greatly reduced, an efficiency of the fingerprint identification is increased, and an identification precision for a poor quality fingerprint is significantly improved.

According to embodiments of a second aspect of the present disclosure, a device for estimating an orientation field of a fingerprint is provided. The device comprises: a first obtaining module, configured to receive a fingerprint to be estimated, to obtain an initial orientation field of the fingerprint to be estimated, and to put the initial orientation field in a reference coordinate system; a second obtaining module, configured to obtain N initial orientation blocks corresponding to the initial orientation field, in which the N initial orientation blocks correspond to N positions of the initial orientation field in the reference coordinate system respectively, and to obtain N orientation block sets corresponding to the N positions respectively from a fingerprint dictionary, in which the fingerprint dictionary comprises M orientation block sets corresponding to M positions in the reference coordinate system, and each of the M orientation block sets comprises a plurality of orientation blocks corresponding to a plurality of training fingerprints in one position of the M positions respectively and in which N≤M; a filtering module, configured to obtain a similarity between each of the N initial orientation blocks and each orientation block in the N orientation block sets corresponding to the N positions to obtain P similarities, and to select a preset number of candidate orientation blocks for each of the N positions from the orientation block set according to the P similarities; a third obtaining module, configured to obtain a compatibility between two candidate orientation blocks corresponding to any two adjacent positions of the N positions respectively to obtain a plurality of compatibilities; and a generating module, configured to obtain a candidate orientation block for each position from the preset number of candidate orientation blocks according to the P similarities and the plurality of compatibilities.

In one embodiment of the present disclosure, the device further comprises a dictionary establishing module configured to establish the fingerprint dictionary. The dictionary establishing module comprises: a first obtaining unit, configured to obtain P training orientation fields corresponding to P training fingerprints respectively, and calibrating P reference points corresponding to the P training orientation fields respectively and P reference directions corresponding to the P training orientation fields respectively; an adjusting unit, configured to adjust the P training orientation fields to the reference coordinate system according to the P reference points and the P reference directions respectively, and to obtain P reference orientation fields corresponding to the P training fingerprints respectively; and a second obtaining unit, configured to obtaining the M orientation block sets according to the P reference orientation fields to establish the fingerprint dictionary.

In one embodiment of the present disclosure, the second obtaining unit is configured to: obtain a first preset size orientation block corresponding to a position $(x_i,y_i)$ in each of the P reference orientation fields; judge whether the first preset size orientation block is in a valid region; if yes, put the first preset size orientation block into a valid set $T(x_i,y_i)$ corresponding to the position $(x_i,y_i)$; and obtain an orientation block set $D(x_i,y_i)$ corresponding to the position $(x_i,y_i)$ by clustering orientation blocks in the valid set $T(x_i,y_i)$.

In one embodiment of the present disclosure, clustering orientation blocks in the valid set $T(x_i,y_i)$ comprises: a. putting any orientation block of the valid set $T(x_i,y_i)$ into the orientation block set $D(x_i,y_i)$; b. selecting another orientation block from the valid set $T(x_i,y_i)$, and obtaining a similarity between the another orientation block and each orientation block of the orientation block set $D(x_i,y_i)$ to obtain a first plurality of similarities; c. if each of the first plurality of similarities is less than a first preset value, putting the another orientation block into the orientation block set $D(x_i,y_i)$; d. if at least one of the first plurality of similarities is larger than or equal to the first preset value, abandoning the another orientation block; and e. repeating step b to d until all the orientation blocks of the valid set $T(x_i,y_i)$ have been selected.

In one embodiment of the present disclosure, the first obtaining module comprises: a third obtaining unit, configured to obtain a foreground image of the fingerprint to be estimated; a dividing unit, configured to divide the foreground image into a plurality of non-overlapping and second preset size image blocks; a four obtaining unit, configured to apply two-dimensional short-time Fourier transform to each of the plurality of non-overlapping and second preset size image blocks, and to obtain a plurality of response directions corresponding to the plurality of non-overlapping and second preset size image blocks respectively; a orientation field establishing unit, configured to establish a foreground orientation field of the fingerprint to be estimated according to the plurality of response directions; and a generating unit, configured to generate the initial orientation field of the fingerprint to be estimated by adjusting the foreground orientation field according to an adjusting algorithm for fingerprint attitude.

In one embodiment of the present disclosure, the filtering module is configured to: obtain an orientation block queue by sorting orientation blocks of the orientation block set $D(x_i,y_i)$ according to the similarities corresponding to the orientation blocks of the orientation block set $D(x_i,y_i)$, obtain a maximum similarity of the similarities, and put the orientation block corresponding to the maximum similarity into a candidate orientation block set; select an orientation block subsequent to the orientation block put into the candidate orientation block set from the orientation block queue and obtain a similarity between the orientation block subsequent to the orientation block put into the candidate orientation block set and each orientation block in the candidate orientation block set to obtain a second plurality of similarities; if each of the second plurality of similarities is less than a second preset value, put the orientation block subsequent to the orientation block put into the candidate orientation block set into the candidate orientation block set; if at least one of the second plurality of similarities is larger than or equal to the second preset value, abandon the orientation block subsequent to the orientation block put into the candidate orientation block set; and repeat step g to i until the number of the candidate orientation blocks in the candidate orientation block set is a preset number.

In one embodiment of the present disclosure, the generating module is configured to establish an objective optimization function according to the P similarities and the plurality of compatibilities, and to obtain the candidate orientation block for each position by optimizing the objective optimization function, in which the objective optimization function is:

$$\min E(r) = \min\left(\sum_{i \in V}(1 - S(\Theta_i, \Phi_{i,r_i})) + w_c \sum_{(i,j) \in N}\left(1 - C(\Phi_{i,r_i}, \Phi_{j,r_j})\right)\right),$$

in which, V is the initial orientation field, i is a position $(x_i,y_i)$ in the initial orientation field V, $\Theta_i$ is an initial orientation block corresponding to the position $(x_i,y_i)$, $\Theta_{i,r_i}$ is an $r_i^{th}$ candidate orientation block corresponding to the position $(x_i,y_i)$, $S(\Theta_i,\Theta_{i,r_i})$ is the similarity between the initial orientation block $\Theta_i$ and the candidate orientation block $\Phi\Theta_{i,r_i}$, N is a set of four-connected adjacent initial orientation blocks, $\Theta_{j,r_j}$ is an $r_j^{th}$ candidate orientation block corresponding to a position $(x_j,y_j)$ adjacent to the position $(x_i,y_i)$, $C(\Theta_{i,r_i},\Theta_{j,r_j})$ is the compatibility between the candidate orientation block $\Theta_{i,r_i}$ and the candidate orientation block $\Theta_{j,r_j}$, $w_c$ is a preset weight.

In one embodiment of the present disclosure, the objective optimization function is optimized according to Graph Cut or confidence transmission method.

With the device according to embodiments of the present disclosure, the candidate orientation block for each position of the reference coordinate system is obtained according to the similarities between each of the N initial orientation blocks and each orientation block in the N orientation block sets, and the compatibilities between two candidate orientation blocks corresponding to any two adjacent positions of the N positions, and thus a rational orientation field of the fingerprint is estimated by global optimization. In addition, with the device according to embodiments of the present disclosure, the orientation field is quantized, pre-knowledge regarding a fingerprint ridge is effectively applied to the estimation of orientation field of the fingerprint, an interference of a complicate background is greatly reduced, an efficiency of the fingerprint identification is increased, and an identification precision for a poor quality fingerprint is significantly improved.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
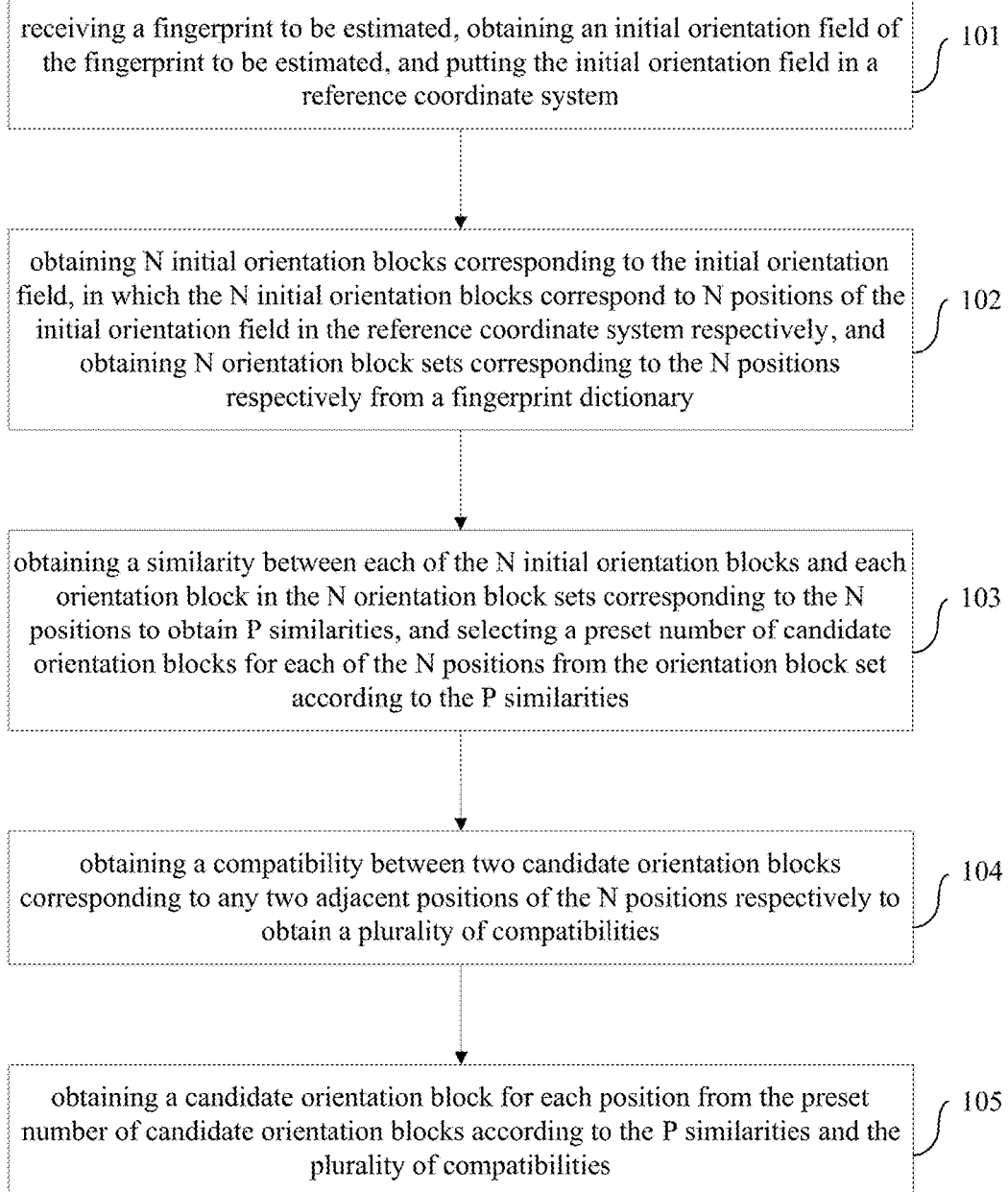
FIG. 1 is a flow chart of a method for estimating an orientation field of a fingerprint according to an embodiment of the present disclosure.

Embodiments of the present disclosure will be described in detail in the following descriptions, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present disclosure. The embodiments shall not be construed to limit the present disclosure.

It is to be understood that phraseology and terminology used herein (such as, terms like "center", "longitudinal", "lateral", "length", "width", "thickness", "up", "down", "front", "rear", "left", "right", "top", "bottom", "inside", "outside", "vertical", "horizontal", "clockwise" and "counterclockwise") are only used to simplify description of the present invention, and do not indicate or imply that the device or element referred to must have or operated in a particular orientation. They cannot be seen as limits to the present disclosure.

It is to be understood that, in the description of the present disclosure, terms of "first" and "second" are only used for description and cannot be seen as indicating or implying relative importance. Unless otherwise stipulated and restricted, it is to be explained that terms of "linkage" and "connection" shall be understood broadly, for example, it could be mechanical connection or electrical connection; it could be direct linkage, indirect linkage via intermediate medium. Those skilled in the art shall understand the concrete notations of the terms mentioned above according to specific circumstances. Furthermore, unless otherwise explained, it is to be understood that a term of "a plurality of" refers to two or more.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions. These and other aspects should be understood by those skilled in the art with reference to the following description and drawings. In these description and drawings, some particular implementations of the present disclosure are disclosed to present some ways for implementing the principle of the present disclosure. However, it should be understood that embodiments of the present disclosure is not limited to this. Contrarily, embodiments of the present disclosure include all the variations, modifications and equivalents within the spirit and scope of the appended claims.

The present disclosure mainly solves problems of establishing a fingerprint dictionary based on pre-knowledge of an orientation field of a fingerprint and estimating the orientation field of the fingerprint with poor quality and/or complicated background texture. For the fingerprint with poor quality and complicated background texture, misleading results may be generated according to a conventional method which cannot ensure an accuracy of an initial orientation field. As fingerprint experts who have pre-knowledge on a fingerprint range can eliminate an interference of strong noise, the characteristics of the fingerprint image should be manually extracted by the fingerprint experts and then be matched with the fingerprints of the fingerprint bank. The pre-knowledge related to the fingerprint is not taken into account, which causes disadvantages to conventional automatical fingerprint identification system both in theory and in practice. Therefore, a model including the pre-knowledge on the fingerprint range needs to be established. Then the orientation field of the fingerprint with poor quality and complicated background texture can be estimated according to the model, which reduces human work, increases an automation, and improves an identification precision for the fingerprint with the poor quality and complicated background texture.

It should be noted that, an orientation field generally refers to a pixel orientation field and an image block orientation field. In embodiments of the present disclosure, the orientation field refers to the image block orientation fields. In other words, a fingerprint image is divided into a plurality of image blocks having a preset size (such as 16×16 pixels) and non-overlapped with each other, and an orientation of each of the plurality of image blocks can be an orientation of a ridge and a valley in each image block. Then, the orientation field of the fingerprint image is formed by the orientations of the plurality of image blocks.

In the following, a method for estimating an orientation field of a fingerprint according to embodiments of the present disclosure will be described in detail with reference to drawings.

FIG. 1 is a flow chart of a method for estimating an orientation field of a fingerprint according to an embodiment of the present disclosure. As shown in FIG. 1, the method comprises the following steps.

At step 101, a fingerprint to be estimated is received, and an initial orientation field of the fingerprint to be estimated is obtained, and the initial orientation field is put in a reference coordinate system.

Figure 2:
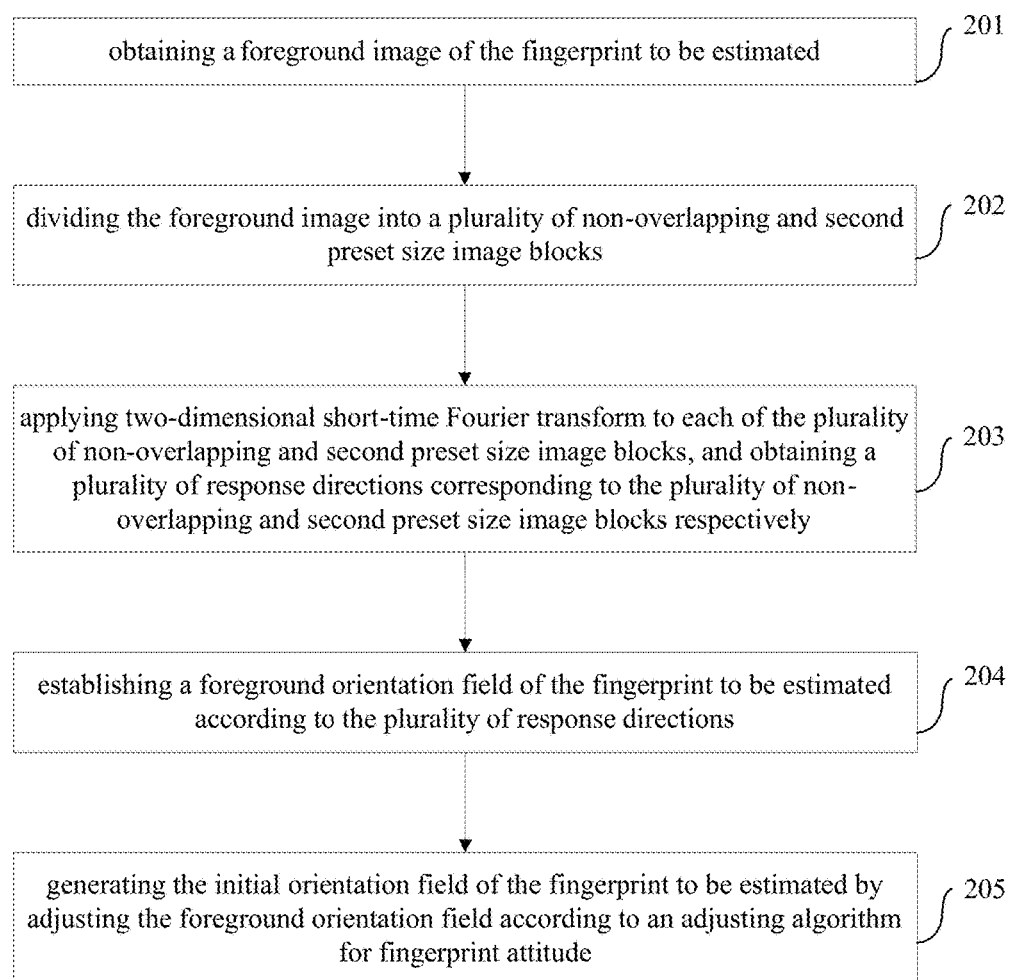
FIG. 2 is a flow chart of a method for obtaining an initial orientation field of a fingerprint to be estimated according to an embodiment of the present disclosure.

FIG. 2 is a flow chart of a method for obtaining the initial orientation field of the fingerprint to be estimated according to an embodiment of the present disclosure. As shown in FIG. 2, obtaining the initial orientation field of the fingerprint to be estimated comprises the following steps.

At step 201, a foreground image of the fingerprint to be estimated is obtained.

In one embodiment of the present disclosure, if the fingerprint is collected from a scene (such as a crime scene), the foreground image should be manually extracted. If the fingerprint is from a fingerprint bank, since a background thereof is very simple, the foreground image can be obtained by applying Fourier transform to the image blocks of the fingerprint respectively without manual extraction. Specifically, for each image block, two waves having the most and the secondary strongest frequency response are obtained by Fourier transform, and then the foreground image can be obtained by comparing a ratio of two amplitudes of the two waves with a threshold.

At step 202, the foreground image is divided into a plurality of non-overlapping and second preset size image blocks.

In one embodiment of the present disclosure, the second preset size can be 16×16 pixels.

At step 203, two-dimensional short-time Fourier transform is applied to each of the plurality of non-overlapping and second preset size image blocks, and a plurality of response directions corresponding to the plurality of non-overlapping and second preset size image blocks are obtained respectively.

In one embodiment of the present disclosure, each image block can be regarded as a two-dimensional surface wave and can be processed by the two-dimensional short-time Fourier transform. Then, a strongest response is found in a frequency domain, such that an orientation having the strongest response is obtained by calculating an angle of the strongest response with respect to a center of the frequency domain.

At step 204, a foreground orientation field of the fingerprint to be estimated is established according to the plurality of response directions.

At step 205, the initial orientation field of the fingerprint to be estimated is generated by adjusting the foreground orientation field according to an adjusting algorithm for fingerprint attitude.

In one embodiment of the present disclosure, the foreground orientation field can be adjusted to the initial orientation field in the reference coordinate system according to any of existing adjusting algorithms for fingerprint attitude.

At step 102, N initial orientation blocks corresponding to the initial orientation field are obtained, in which the N initial orientation blocks correspond to N positions of the initial orientation field in the reference coordinate system respectively, and N orientation block sets corresponding to the N positions respectively are obtained from a fingerprint dictionary, in which the fingerprint dictionary comprises M orientation block sets corresponding to M positions in the reference coordinate system, and each of the M orientation block sets comprises a plurality of orientation blocks corresponding to a plurality of training fingerprints in one position of the M positions respectively and in which N≤M.

In one embodiment of the present disclosure, in order to ensure the fingerprint dictionary is real and representative, the fingerprint dictionary may be established according to statistical results of orientation fields of a group of real training fingerprints calibrated manually.

Figure 3:
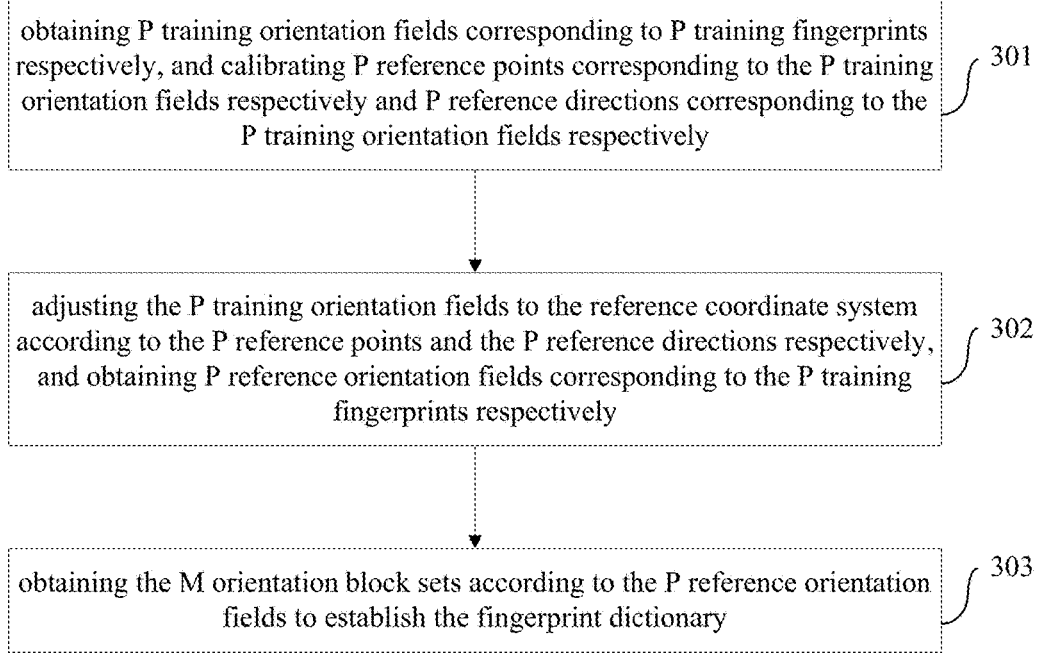
FIG. 3 is a flow chart of a method for establishing a fingerprint dictionary according to an embodiment of the present disclosure.

FIG. 3 is a flow chart of a method for establishing the fingerprint dictionary according to an embodiment of the present disclosure. As shown in FIG. 3 establishing the fingerprint dictionary comprises the following steps.

At step 301, P training orientation fields corresponding to P training fingerprints respectively are obtained, and P reference points corresponding to the P training orientation fields respectively and P reference directions corresponding to the P training orientation fields respectively are calibrated.

In one embodiment of the present disclosure, firstly, P valid areas with high image quality (i.e., high enough to tell orientation) are calibrated manually in the P training fingerprints respectively. Subsequently, the P training orientation fields of the P training fingerprints are calibrated manually in the P valid areas respectively. Then the P reference points corresponding to the P training orientation fields respectively and the P reference directions corresponding to the P training orientation fields are calibrated manually.

Figure 4:
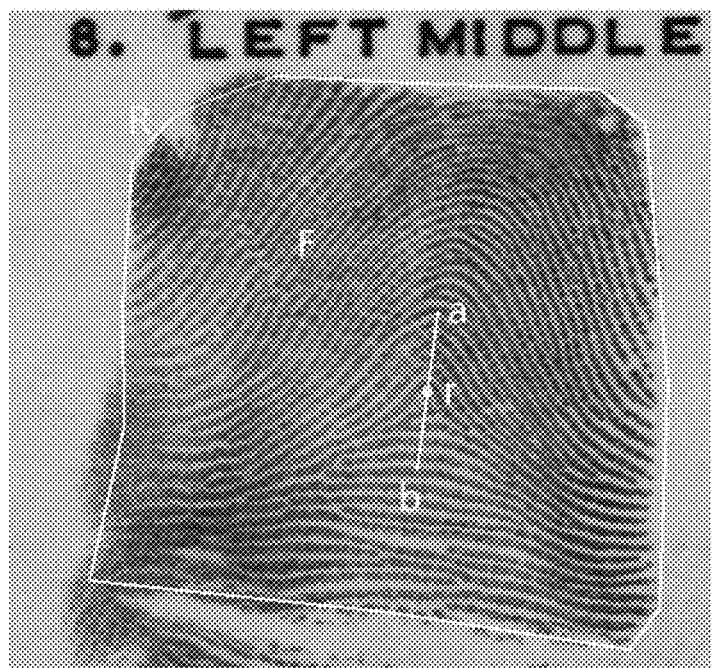
FIG. 4 is a schematic diagram of a reference point and a reference direction of a training fingerprint according to an embodiment of the present disclosure.

FIG. 4 is a schematic diagram of a reference point and a reference direction of a training fingerprint according to an embodiment of the present disclosure. Specifically, as shown in FIG. 4, the reference point (point r shown in FIG. 4) is a midpoint between point a and point b shown in FIG. 4, and the reference direction may be directed from point b to point a, in which point a is a vertex of a lowest ridge extending from left to right of the training fingerprint and in an upper part of the training fingerprint, and point b is a midpoint of a highest ridge in a lower part of the training fingerprint. Alternatively, the reference direction may be directed from point b to point a.

At step 302, the P training orientation fields are adjusted to the reference coordinate system according to the P reference points and the P reference directions respectively, and P reference orientation fields corresponding to the P training fingerprints respectively are obtained.

Figure 5A:
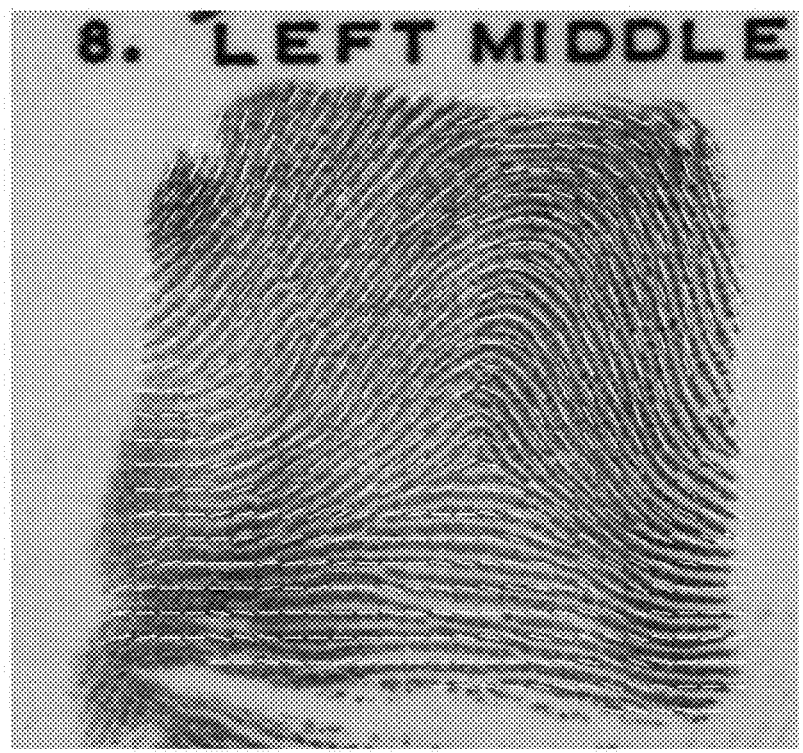
FIG. 5a is a schematic diagram of a training orientation field before an adjustment according to an embodiment of the present disclosure.
Figure 5B:
FIG. 5b is a schematic diagram of the training orientation field after the adjustment according to an embodiment of the present disclosure.

In one embodiment of the present disclosure, the P training orientation fields can be adjusted according to the reference coordinate system. For instance, the P training orientation fields are processed by a rotation, a translation and a direction interpolation respectively, such that the reference point of each training orientation field is adjusted to an origin of the reference coordinate system, and the reference direction of each training orientation field is adjusted to a positive direction of y axis of the reference coordinate system. The adjusted training orientation field is used as the reference orientation field of the training fingerprint. FIG. 5a is a schematic diagram of the training orientation field before adjustment according to an embodiment of the present disclosure, and FIG. 5b is a schematic diagram of the training orientation field after adjustment according to an embodiment of the present disclosure.

At step 303, the M orientation block sets are obtained according to the P reference orientation fields to establish the fingerprint dictionary.

Figure 6:
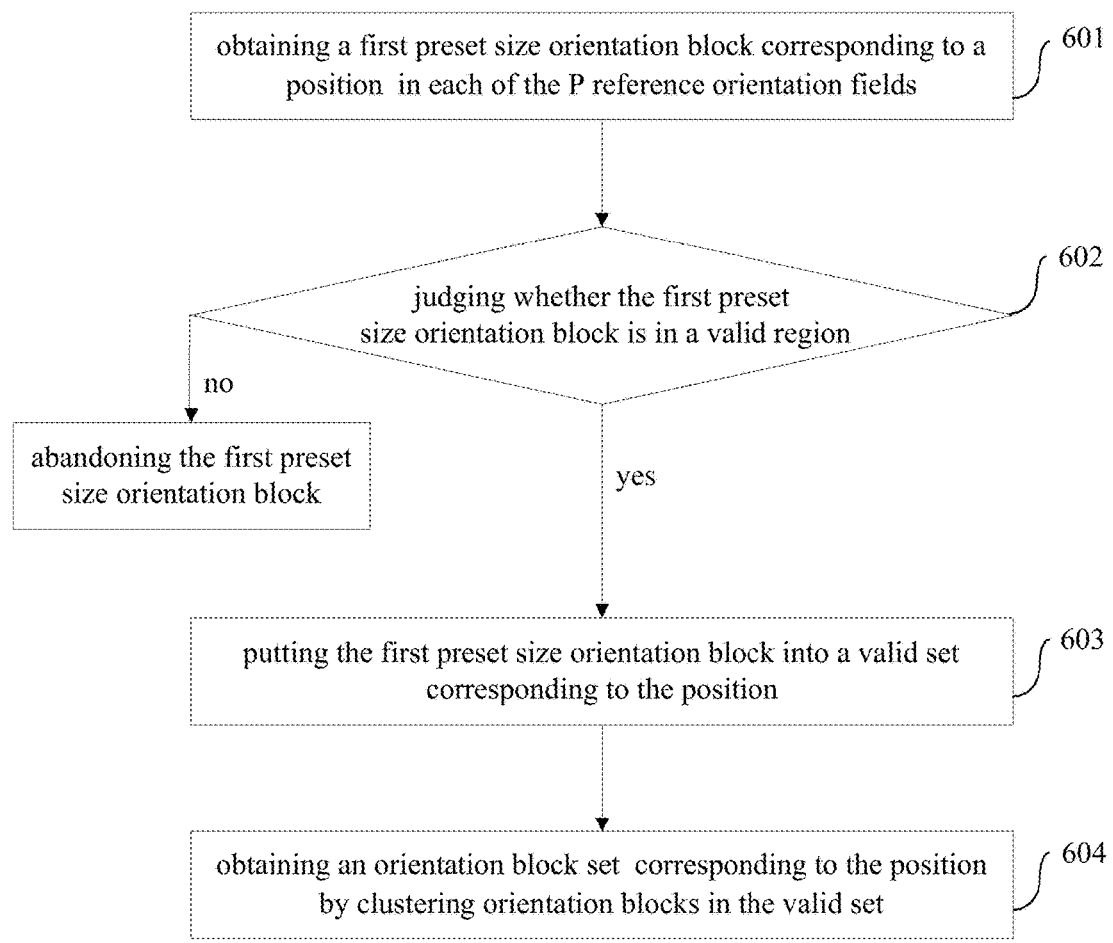
FIG. 6 is a flow chart of a method for obtaining M orientation block sets according to P reference orientation fields according to an embodiment of the present disclosure.

FIG. 6 is a flow chart of a method for obtaining the M orientation block sets according to the P reference orientation fields according to an embodiment of the present disclosure. As shown in FIG. 6, obtaining the M orientation block sets according to the P reference orientation fields comprises the following steps.

At step 601, a first preset size orientation block corresponding to a position $(x_i,y_i)$ in each of the P reference orientation fields is obtained.

In one embodiment of the present disclosure, the first preset size orientation block is obtained by sliding a first preset size window on each of the P reference orientation fields from left to right and from top to bottom. In one embodiment of the present disclosure, the first preset size is d×d(in which d may be of any value, such as d=4), which means that the window contains d×d image blocks (in one embodiment, a size of each image block may be 16×16 pixels). Each image block contains one direction of the reference orientation field. As the window slides at the position $(x_i,y_i)$, one first preset size orientation block is obtained.

At step 602, it is judged whether the first preset size orientation block is in a valid region, and if yes, execute step 603.

Specifically, if each image block in the first preset size orientation block contains a direction of the reference orientation field, the first preset size orientation block is in the valid region, and if a image block in the first preset size orientation block does not contain the direction of the reference orientation field, the first preset size orientation block is not in the valid region.

At step 603, the first preset size orientation block is put into a valid set $T(x_i,y_i)$ corresponding to the position $(x_i,y_i)$.

For each reference orientation field, if the first preset size orientation block corresponding to the position $(x_i,y_i)$ is in the valid region of the reference orientation field, the first preset size orientation block will be put into the valid set $T(x_i,y_i)$ corresponding to the position $(x_i,y_i)$.

Figure 7:
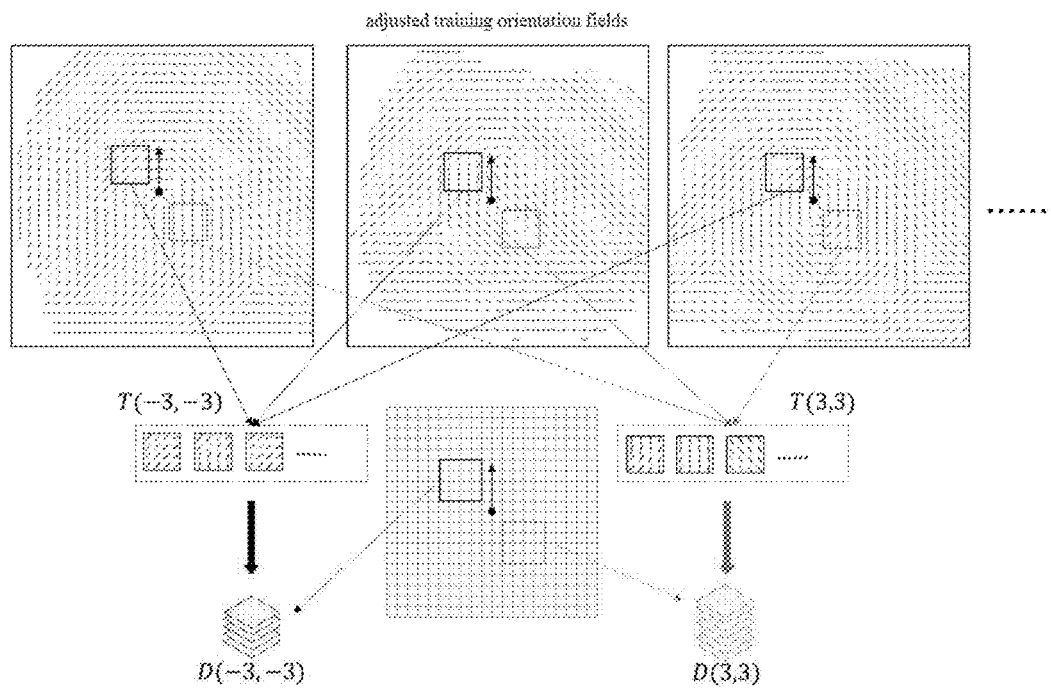
FIG. 7 is a schematic diagram of valid sets T(−3,−3) and T(3,3) corresponding to position (−3,−3) and position (3, 3) according to an embodiment of the present disclosure according to an embodiment of the present disclosure.

Thus, one valid set containing a plurality of first preset size orientation blocks is obtained corresponding to the position $(x_i,y_i)$, and a plurality of valid sets are obtained corresponding to a plurality of positions in the reference coordinate system. FIG. 7 is a schematic diagram of valid sets T(−3,−3) and T(3,3) corresponding to position (−3,−3) and position (3, 3) according to an embodiment of the present disclosure.

At step 604, an orientation block set $D(x_i,y_i)$ corresponding to the position $(x_i,y_i)$ is obtained by clustering orientation blocks in the valid set $T(x_i,y_i)$.

As the number of the training fingerprints rising, the number of orientation blocks in each valid set rises, which will increase a workload of fingerprint matching and reduce an efficiency of estimating the orientation field of the fingerprint. So each valid set should be clustered.

Firstly, an empty orientation block set $D(x_i,y_i)$ is initially given, and any orientation block of the valid set $T(x_i,y_i)$ is put into the orientation block set $D(x_i,y_i)$. Subsequently, another orientation block is selected from the valid set $T(x_i,y_i)$, and a first plurality of similarities are obtained by obtaining a similarity between the another orientation block and each orientation block of the orientation block set $D(x_i,y_i)$. If each of the first plurality of similarities is less than a first preset value, the another orientation block will be put into the orientation block set $D(x_i,y_i)$. If at least one of the first plurality of similarities is larger than or equal to the first preset value, the another orientation block will be abandoned. Clustering orientation blocks in the valid set $T(x_i,y_i)$ is finished until all the orientation blocks in the valid set $T(x_i,y_i)$ are selected to be put into the orientation block set $D(x_i,y_i)$ or to be abandoned. For instance, as shown in FIG. 7, orientation block sets D(−3,−3) and D(3,3) corresponding to position (−3,−3) and position (3, 3) respectively are obtained by clustering the valid sets T(−3,−3) and T(3, 3) respectively.

At step 103, P similarities are obtained by obtaining a similarity between each of the N initial orientation blocks and each orientation block in the N orientation block sets corresponding to the N positions, and a preset number of candidate orientation blocks for each of the N positions are selected from the orientation block set according to the P similarities.

Specifically, $Q_i$ similarities are obtained as a similarity between the initial orientation block corresponding to the position $(x_i,y_i)$ and each orientation block in the orientation block set $D(x_i,y_i)$ is obtained. Then, a preset number of candidate orientation blocks for the position $(x_i,y_i)$ are selected from the orientation block set according to the $Q_i$ similarities. In one embodiment of the present disclosure, the preset number may be 6.

It should be noted that the number $Q_i$ may be different from $Q_j$ in which $Q_j$ is a number of similarities between the initial orientation block corresponding to the position $(x_j,y_j)$ and each orientation block in the orientation block set $D(x_j,y_j)$, and i∈(1,N), j∈(1,N).

In one embodiment of the present disclosure, selecting preset number of candidate orientation blocks for each of the N positions from the orientation block set corresponding to the initial orientation block according to the P similarities comprises the following steps.

At step 1031, an orientation block queue is obtained by sorting orientation blocks of the orientation block set $D(x_i, y_i)$ according to the similarities corresponding to the orientation blocks of the orientation block set $D(x_i,y_i)$, a maximum similarity of the similarities is obtained, and the orientation block corresponding to the maximum similarity is put into a candidate orientation block set.

At step 1032, an orientation block subsequent to the orientation block put into the candidate orientation block set is selected from the orientation block queue, and a second plurality of similarities are obtained by obtaining a similarity between the orientation block subsequent to the orientation block put into the candidate orientation block set and each orientation block in the candidate orientation block set.

At step 1033, If each of the second plurality of similarities is less than a second preset value, the orientation block subsequent to the orientation block put into the candidate orientation block set will be put into the candidate orientation block set.

At step 1034, If at least one of the second plurality of similarities is larger than or equal to the second preset value, the orientation block subsequent to the orientation block put into the candidate orientation block set will be abandoned.

Then repeat step 1032 to step 1034 until the number of the candidate orientation blocks in the candidate orientation block set is up to a preset number.

Though the candidate orientation blocks selected from the orientation block set according to the N similarities are very similar, all the candidate orientation blocks may be wrong candidate orientation blocks for the position $(x_i,y_i)$ when there is a strong local noise. Therefore, the candidate orientation blocks are selected according to not only the similarities but also a diversification constraint to improve a diversity of the candidate orientation blocks.

Figure 8:
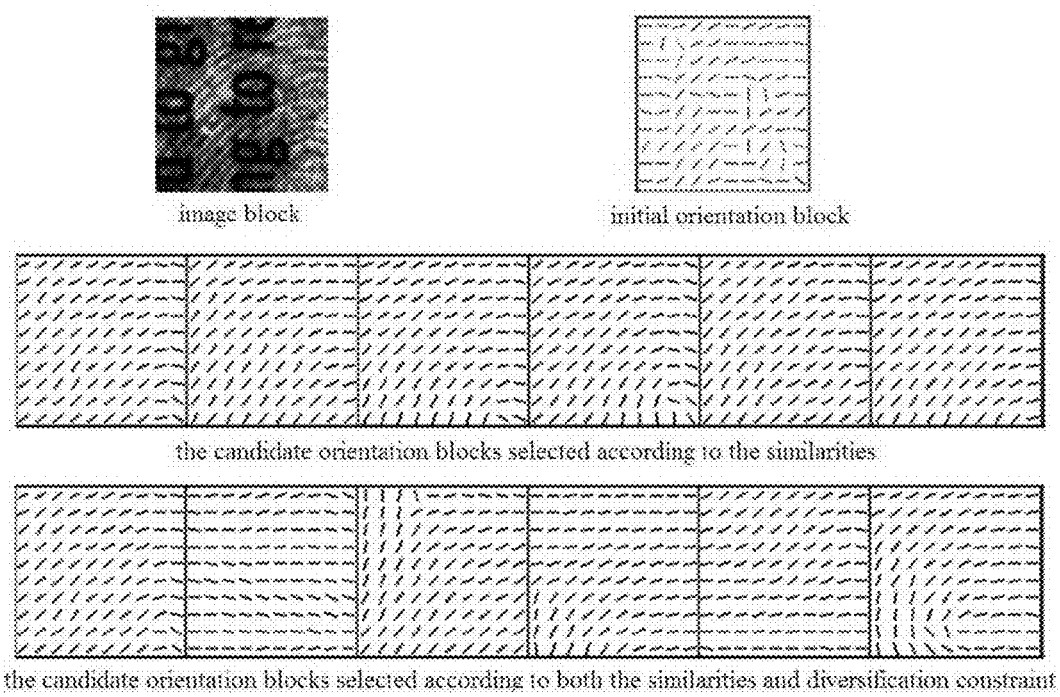
FIG. 8 is a schematic diagram of a comparison between the candidate orientation blocks selected according to similarities and the candidate orientation blocks selected according to both the similarities and a diversification constraint according to an embodiment of the present disclosure.

FIG. 8 is a schematic diagram of a comparison between the candidate orientation blocks selected according to the similarities and the candidate orientation blocks selected according to both the similarities and the diversification constraint according to an embodiment of the present disclosure. As shown in FIG. 8, the candidate orientation blocks selected according to both the similarities and the diversification constraint are more similar to the image block of the fingerprint than the candidate orientation blocks selected according to the similarities.

At step 104, a plurality of compatibilities are obtained by obtaining a compatibility between two candidate orientation blocks corresponding to any two adjacent positions of the N positions respectively.

In one embodiment of the present disclosure, it is ensured that each candidate orientation block obtained according to the similarities is similar to the initial orientation block, but it is not ensured that the candidate orientation blocks of any two adjacent positions match with each other. So it is necessary to obtain compatibilities between two candidate orientation blocks corresponding to any two adjacent positions of the N positions respectively. As two candidate orientation blocks corresponding to two adjacent positions have an overlap region, the compatibility between the two candidate orientation blocks can be measured according to the similarity of the orientation field of the overlap region.

Figure 9A:
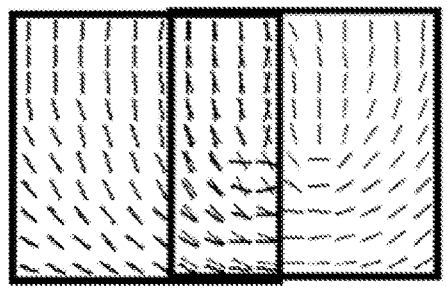
FIG. 9a is a schematic diagram of two candidate orientation blocks with high compatibility according to an embodiment of the present disclosure.
Figure 9B:
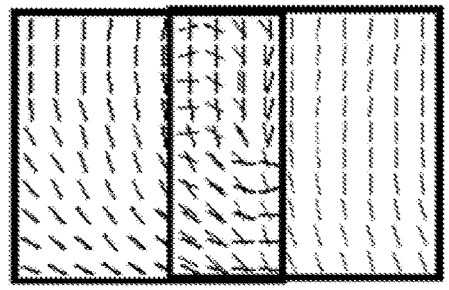
FIG. 9b is a schematic diagram of two candidate orientation blocks with low compatibility according to an embodiment of the present disclosure.

FIG. 9 is a schematic diagram of the compatibility between two candidate orientation blocks corresponding to two adjacent positions according to an embodiment of the present disclosure, in which FIG. 9a is a schematic diagram of two candidate orientation blocks with high compatibility, and FIG. 9b is a schematic diagram of two candidate orientation blocks with low compatibility.

At step 105, a candidate orientation block for each position is obtained from the preset number of candidate orientation blocks according to the P similarities and the plurality of compatibilities.

In one embodiment of the present disclosure, if k candidate orientation blocks have been obtained for each position, k×k compatibilities will be obtained as there is one compatibility between any two candidate orientation blocks corresponding to two adjacent positions respectively.

Specifically, an objective optimization function is established according to the P similarities and the plurality of compatibilities, and an optimized candidate orientation block for each position is obtained by optimizing the objective optimization function, in which the objective optimization function is:

$$\min E(r) = \min\left(\sum_{i \in V}(1 - S(\Theta_i, \Phi_{i,r_i})) + w_c \sum_{(i,j) \in N}(1 - C(\Phi_{i,r_i}, \Phi_{j,r_j}))\right),$$

in which, V is the initial orientation field, i is a position $(x_i, y_i)$ in the initial orientation field V, $\Theta_i$ is an initial orientation block corresponding to the position $(x_i, y_i)$, $\Theta_{i,r_i}$ is an $r_i^{th}$ candidate orientation block corresponding to the position $(x_i, y_i)$, $S(\Theta_i, \Theta_{i,r_i})$ is the similarity between the initial orientation block $\Theta i$ and the candidate orientation block $\Theta_{i,r_i}$, N is a set of four-connected adjacent initial orientation blocks, $\Theta_{j,r_j}$ is an $r_j^{th}$ candidate orientation block corresponding to a position $(x_j, y_j)$ adjacent to the position $(x_i, y_i)$, $C(\Theta_{i,r_i}, \Theta_{j,r_j})$ is the compatibility between the candidate orientation block $\Theta_{i,r_i}$ and the candidate orientation block $\Theta_{j,r_j}$, $w_c$ is a preset weight for weighting the similarity and the compatibility.

In embodiments of the present disclosure, there are many existing methods for optimizing the objective optimization function. For instance, the objective optimization function may be optimized according to methods (such as graph cut or confidence transmission) mentioned in A. Blake, P. Kohli, and C. Rother, Eds., Markov Random Fields for Vision and Image Processing, MIT Press, 2011. Finally one candidate orientation block is selected from the k candidate orientation blocks as a final orientation field for each position, and thus the orientation field of the fingerprint is obtained.

It should be noted that, in one embodiment of the present disclosure, the step of establishing the fingerprint dictionary is an off-line step, that is, only needs to be performed one time. Then the orientation field of the fingerprint can be estimated by consulting the fingerprint dictionary on-line.

With the method according to embodiments of the present disclosure, the candidate orientation block for each position of the reference coordinate system is obtained according to the similarities between each of the N initial orientation blocks and each orientation block in the N orientation block sets, and the compatibilities between two candidate orientation blocks corresponding to any two adjacent positions of the N positions, and thus a rational orientation field of the fingerprint is estimated by global optimization. In addition, with the method according to embodiments of the present disclosure, the orientation field is quantized, pre-knowledge regarding a fingerprint ridge is effectively applied to the estimation of orientation field of the fingerprint, an interference of a complicate background is greatly reduced, an efficiency of the fingerprint identification is increased, and an identification precision for a poor quality fingerprint is significantly improved.

A device for estimating an orientation field of a fingerprint is further provided according to embodiments of the present disclosure.

Figure 10:
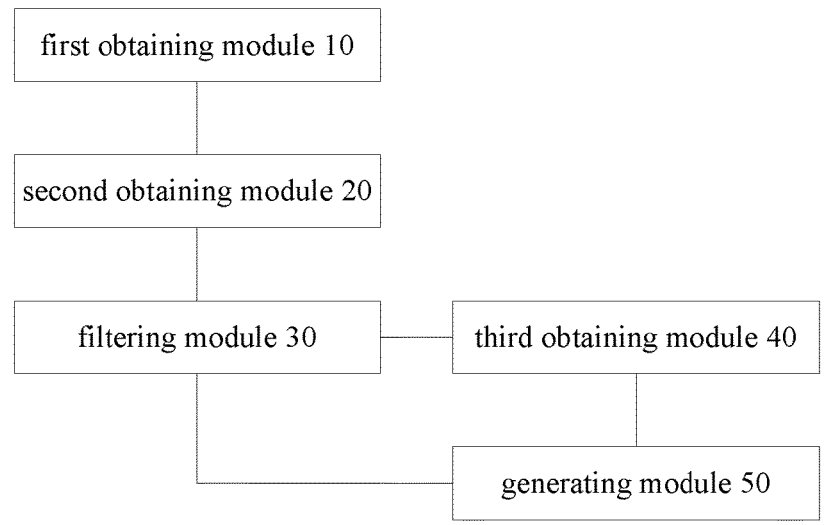
FIG. 10 is a block diagram of a device for estimating an orientation field of a fingerprint according to an embodiment of the present disclosure.

FIG. 10 is a block diagram of a device for estimating an orientation field of a fingerprint according to an embodiment of the present disclosure. As shown in FIG. 10, the device for estimating the orientation field of the fingerprint comprises a first obtaining module 10, a second obtaining module 20, a filtering module 30, a third obtaining module 40 and a generating module 50.

Specifically, the first obtaining module 10 is configured to receive a fingerprint to be estimated, to obtain an initial orientation field of the fingerprint to be estimated, and to put the initial orientation field in a reference coordinate system.

The second obtaining module 20 is configured to obtain N initial orientation blocks corresponding to the initial orientation field, in which the N initial orientation blocks correspond to N positions of the initial orientation field in the reference coordinate system respectively, and to obtain N orientation block sets corresponding to the N positions respectively from a fingerprint dictionary, in which the fingerprint dictionary comprises M orientation block sets corresponding to M positions in the reference coordinate system, and each of the M orientation block sets comprises a plurality of orientation blocks corresponding to a plurality of training fingerprints in one position of the M positions respectively and in which N≤M.

The filtering module 30 is configured to obtain a similarity between each of the N initial orientation blocks and each orientation block in the N orientation block sets corresponding to the N positions to obtain P similarities, and to select a preset number of candidate orientation blocks for each of the N positions from the orientation block set according to the P similarities.

Specifically, the $Q_i$ similarities are obtained as a similarity between the initial orientation block corresponding to the position $(x_i,y_i)$ and each orientation block in the orientation block set $D(x_i,y_i)$ is obtained. Then, a preset number of candidate orientation blocks for the position $(x_i,y_i)$ are selected from the orientation block set according to the $Q_i$ similarities. In one embodiment of the present disclosure, the preset number may be 6.

It should be noted that the number $Q_i$ may be different from $Q_j$ in which $Q_j$ is a number of similarities between the initial orientation block corresponding to the position $(x_j,y_j)$ and each orientation block in the orientation block set $D(x_j,y_j)$, and i∈(1,N), j∈(1,N).

In one embodiment of the present disclosure, the filtering module 30 is specifically configured to: f. obtain an orientation block queue by sorting orientation blocks of the orientation block set $D(x_i,y_i)$ according to the similarities corresponding to the orientation blocks of the orientation block set $D(x_i,y_i)$, obtain a maximum similarity of the similarities, and put the orientation block corresponding to the maximum similarity into a candidate orientation block set; g. select an orientation block subsequent to the orientation block put into the candidate orientation block set from the orientation block queue and obtain a similarity between the orientation block subsequent to the orientation block put into the candidate orientation block set and each orientation block in the candidate orientation block set to obtain a second plurality of similarities; h. if each of the second plurality of similarities is less than a second preset value, put the orientation block subsequent to the orientation block put into the candidate orientation block set into the candidate orientation block set; i. if at least one of the second plurality of similarities is larger than or equal to the second preset value, abandon the orientation block subsequent to the orientation block put into the candidate orientation block set; and j. repeat step g to step i until the number of the candidate orientation blocks in the candidate orientation block set is up to a preset number.

Though the candidate orientation blocks selected from the orientation block set according to the N similarities are very similar, all the candidate orientation blocks may be wrong candidate orientation blocks for the position $(x_i,y_i)$ when there is a strong local noise. Therefore, the candidate orientation blocks are selected according to not only the similarities but also a diversification constraint to improve a diversity of the candidate orientation blocks.

FIG. 8 is a schematic diagram of a comparison between the candidate orientation blocks selected according to the similarities and the candidate orientation blocks selected according to both the similarities and the diversification constraint according to an embodiment of the present disclosure. As shown in FIG. 8, the candidate orientation blocks selected according to both the similarities and the diversification constraint are more similar to the image block of the fingerprint than the candidate orientation blocks selected according to the similarities.

The third obtaining module 40 is configured to obtain a compatibility between two candidate orientation blocks corresponding to any two adjacent positions of the N positions respectively to obtain a plurality of compatibilities.

In one embodiment of the present disclosure, it is ensured that each candidate orientation block obtained according to the similarities is similar to the initial orientation block, but it is not ensured that the candidate orientation blocks of any two adjacent positions match with each other. So it is necessary to obtain compatibilities between two candidate orientation blocks corresponding to any two adjacent positions of the N positions respectively. As two candidate orientation blocks corresponding to two adjacent positions have an overlap region, the compatibility between the two candidate orientation blocks can be measured according to the similarity of the orientation field of the overlap region.

FIG. 9 is a schematic diagram of the compatibility between two candidate orientation blocks corresponding to two adjacent positions according to an embodiment of the present disclosure, in which FIG. 9a is a schematic diagram of two candidate orientation blocks with high compatibility, and FIG. 9b is a schematic diagram of two candidate orientation blocks with low compatibility.

The generating module 50 is configured to obtain a candidate orientation block for each position from the preset number of candidate orientation blocks according to the P similarities and the plurality of compatibilities.

In one embodiment of the present disclosure, if k candidate orientation blocks have been obtained for each position, k×k compatibilities will be obtained as there is one compatibility between any two candidate orientation blocks corresponding to two adjacent positions respectively.

Specifically, an objective optimization function is established according to the P similarities and the plurality of compatibilities, and an optimized candidate orientation block for each position is obtained by optimizing the objective optimization function, in which the objective optimization function is:

$$\min E(r) = \min\left(\sum_{i \in V}(1 - S(\Theta_i, \Phi_{i,r_i})) + w_c \sum_{(i,j) \in N}(1 - C(\Phi_{i,r_i}, \Phi_{j,r_j}))\right),$$

in which, V is the initial orientation field, i is a position $(x_i,y_i)$ in the initial orientation field V, $\Theta_i$ is an initial orientation block corresponding to the position $(x_i,y_i)$, $\Theta_{i,r_i}$ is an $r_i^{th}$ candidate orientation block corresponding to the position $(x_i,y_i)$, $S(\Theta_i,\Phi_{i,r_i})$ is the similarity between the initial orientation block $\Theta i$ and the candidate orientation block $\Theta_{i,r_i}$, N is a set of four-connected adjacent initial orientation blocks, $\Theta_{j,r_j}$ is an $r_j^{th}$ candidate orientation block corresponding to a position $(x_j,y_j)$ adjacent to the position $(x_i,y_i)$, $C(\Theta_{i,r_i},\Theta_{j,r_j})$ is the compatibility between the candidate orientation block $\Theta_{i,r_i}$ and the candidate orientation block $\Theta_{j,r_j}$, $w_c$ is a preset weight for weighting the similarity and the compatibility.

In embodiments of the present disclosure, there are many existing methods for optimizing the objective optimization function. For instance, the objective optimization function may be optimized according to methods (such as graph cut or confidence transmission) mentioned in A. Blake, P. Kohli, and C. Rother, Eds., Markov Random Fields for Vision and Image Processing, MIT Press, 2011. Finally one candidate orientation block is selected from the k candidate orientation blocks as a final orientation field for each position, and thus the orientation field of the fingerprint is obtained.

It should be noted that, in one embodiment of the present disclosure, the step of establishing the fingerprint dictionary is an off-line step, that is, only needs to be performed one time. Then the orientation field of the fingerprint can be estimated by consulting the fingerprint dictionary on-line.

Figure 11:
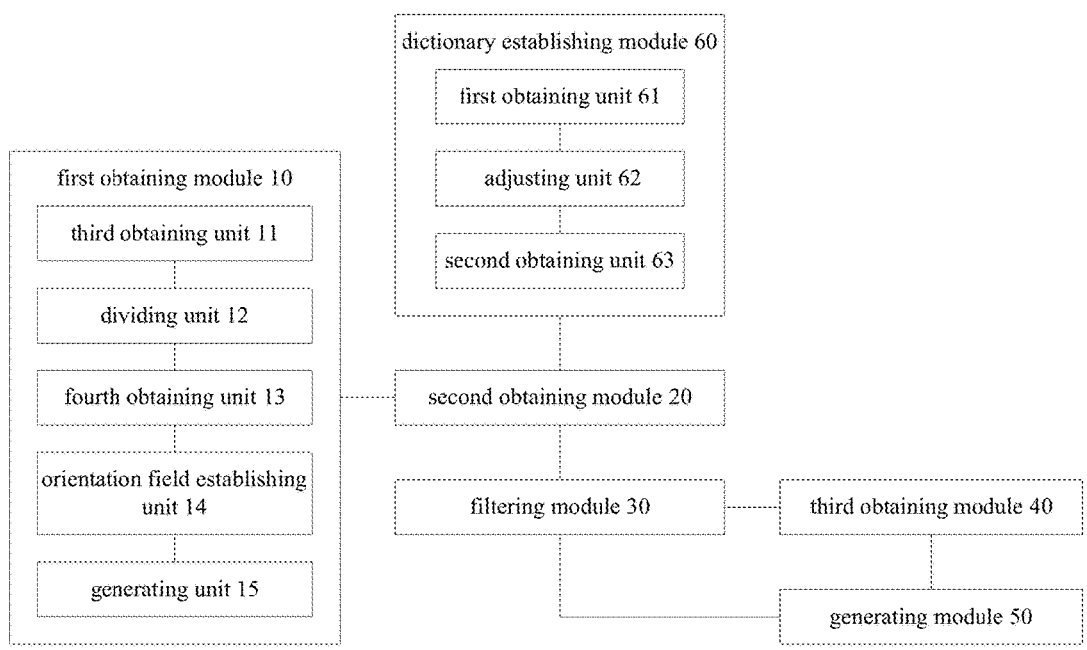
FIG. 11 is a block diagram of a device for estimating an orientation field of a fingerprint according to an embodiment of the present disclosure.

FIG. 11 is a block diagram of a device for estimating an orientation field of a fingerprint according to an embodiment of the present disclosure. In one embodiment of the present disclosure, in order to ensure the fingerprint dictionary is real and representative, the fingerprint dictionary may be established according to statistical results of orientation fields of a group of real training fingerprints calibrated manually. As shown in FIG. 11, the device for estimating the orientation field of the fingerprint comprises a first obtaining module 10, a second obtaining module 20, a filtering module 30, a third obtaining module 40, a generating module 50 and a dictionary establishing module 60. The first obtaining module 10 comprises a third obtaining unit 11, a dividing unit 12, a four obtaining unit 13, a orientation field establishing unit 14, and a generating unit 15, and the dictionary establishing module 60 comprises a first obtaining unit 61, a adjusting unit 62 and a second obtaining unit 63.

Specifically, the third obtaining unit 11 is configured to obtain a foreground image of the fingerprint to be estimated. In one embodiment of the present disclosure, if the fingerprint is collected from a scene (such as a crime scene), the foreground image should be manually extracted. If the fingerprint is from a fingerprint bank, since a background thereof is very simple, the foreground image can be obtained by applying Fourier transform to the image blocks of the fingerprint respectively without manual extraction. Specifically, for each image block, two waves having the most and the secondary strongest frequency response are obtained by Fourier transform, and then the foreground image can be obtained by comparing a ratio of two amplitudes of the two waves with a threshold.

The dividing unit 12 is configured to divide the foreground image into a plurality of non-overlapping and second preset size image blocks. In one embodiment of the present disclosure, the second preset size can be 16×16 pixels.

The four obtaining unit 13 is configured to apply two-dimensional short-time Fourier transform to each of the plurality of non-overlapping and second preset size image blocks, and to obtain a plurality of response directions corresponding to the plurality of non-overlapping and second preset size image blocks respectively. In one embodiment of the present disclosure, each image block can be regarded as a two-dimensional surface wave and can be processed by the two-dimensional short-time Fourier transform. Then, a strongest response is found in a frequency domain, such that an orientation having the strongest response is obtained by calculating an angle of the strongest response with respect to a center of the frequency domain.

The orientation field establishing unit 14 is configured to establish a foreground orientation field of the fingerprint to be estimated according to the plurality of response directions.

The generating unit 15 is configured to generate the initial orientation field of the fingerprint to be estimated by adjusting the foreground orientation field according to an adjusting algorithm for fingerprint attitude. In one embodiment of the present disclosure, the foreground orientation field can be adjusted to the initial orientation field in the reference coordinate system according to any of existing adjusting algorithms for fingerprint attitude.

The dictionary establishing module 60 is configured to establish the fingerprint dictionary.

The first obtaining unit 61 is configured to obtain P training orientation fields corresponding to P training fingerprints respectively, and to calibrate P reference points corresponding to the P training orientation fields respectively and P reference directions corresponding to the P training orientation fields respectively. In one embodiment of the present disclosure, firstly, P valid areas with high image quality (i.e., high enough to tell orientation) are calibrated manually in the P training fingerprints respectively. Subsequently, the P training orientation fields of the P training fingerprints are calibrated manually in the P valid areas respectively. Then the P reference points corresponding to the P training orientation fields respectively and the P reference directions corresponding to the P training orientation fields are calibrated manually.

FIG. 4 is a schematic diagram of a reference point and a reference direction of a training fingerprint according to an embodiment of the present disclosure. Specifically, as shown in FIG. 4, the reference point (point r shown in FIG. 4) is a midpoint between point a and point b shown in FIG. 4, and the reference direction may be directed from point b to point a, in which point a is a vertex of a lowest ridge extending from left to right of the training fingerprint and in an upper part of the training fingerprint, and point b is a midpoint of a highest ridge in a lower part of the training fingerprint. Alternatively, the reference direction may be directed from point b to point a.

The adjusting unit 62 is configured to adjust the P training orientation fields to the reference coordinate system according to the P reference points and the P reference directions respectively, and to obtain P reference orientation fields corresponding to the P training fingerprints respectively. In one embodiment of the present disclosure, the P training orientation fields can be adjusted according to the reference coordinate system. For instance, the P training orientation fields are processed by a rotation, a translation and a direction interpolation respectively, such that the reference point of each training orientation field is adjusted to an origin of the reference coordinate system, and the reference direction of each training orientation field is adjusted to a positive direction of y axis of the reference coordinate system. The adjusted training orientation field is used as the reference orientation field of the training fingerprint.

FIG. 5a is a schematic diagram of the training orientation field before adjustment according to an embodiment of the present disclosure, and FIG. 5b is a schematic diagram of the training orientation field after adjustment according to an embodiment of the present disclosure.

The second obtaining unit 63 is configured to obtaining the M orientation block sets according to the P reference orientation fields to establish the fingerprint dictionary. In one embodiment of the present disclosure, the P training orientation fields can be adjusted according to the reference coordinate system. For instance, as shown in FIG. 6, obtaining the M orientation block sets according to the P reference orientation fields comprises the following steps.

At step 601, a first preset size orientation block corresponding to a position $(x_i, y_i)$ in each of the P reference orientation fields is obtained.

In one embodiment of the present disclosure, the first preset size orientation block is obtained by sliding a first preset size window on each of the P reference orientation fields from left to right and from top to bottom. In one embodiment of the present disclosure, the first preset size is d×d (in which d may be of any value, such as d=4), which means that the window contains d×d image blocks (in one embodiment, a size of each image block may be 16×16 pixels). Each image block contains one direction of the reference orientation field. As the window slides at the position $(x_i, y_i)$, one first preset size orientation block is obtained.

At step 602, it is judged whether the first preset size orientation block is in a valid region, and if yes, execute step 603.

Specifically, if each image block in the first preset size orientation block contains a direction of the reference orientation field, the first preset size orientation block is in the valid region, and if a image block in the first preset size orientation block does not contain the direction of the reference orientation field, the first preset size orientation block is not in the valid region.

At step 603, the first preset size orientation block is put into a valid set $T(x_i,y_i)$ corresponding to the position $(x_i,y_i)$.

For each reference orientation field, if the first preset size orientation block corresponding to the position $(x_i,y_i)$ is in the valid region of the reference orientation field, the first preset size orientation block will be put into the valid set $T(x_i,y_i)$ corresponding to the position $(x_i,y_i)$. Thus, one valid set containing a plurality of first preset size orientation blocks is obtained corresponding to the position $(x_i,y_i)$, and a plurality of valid sets are obtained corresponding to a plurality of positions in the reference coordinate system. FIG. 7 is a schematic diagram of valid sets $T(-3,-3)$ and $T(3,3)$ corresponding to position $(-3,-3)$ and position $(3, 3)$ according to an embodiment of the present disclosure.

At step 604, an orientation block set $D(x_i,y_i)$ corresponding to the position $(x_i,y_i)$ is obtained by clustering orientation blocks in the valid set $T(x_i,y_i)$.

As the number of the training fingerprints rising, the number of orientation blocks in each valid set rises, which will increase a workload of fingerprint matching and reduce an efficiency of estimating the orientation field of the fingerprint. So each valid set should be clustered.

Firstly, an empty orientation block set $D(x_i,y_i)$ is initially given, and any orientation block of the valid set $T(x_i,y_i)$ is put into the orientation block set $D(x_i,y_i)$. Subsequently, another orientation block is selected from the valid set $T(x_i,y_i)$, and a first plurality of similarities are obtained by obtaining a similarity between the another orientation block and each orientation block of the orientation block set $D(x_i,y_i)$. If each of the first plurality of similarities is less than a first preset value, the another orientation block will be put into the orientation block set $D(x_i,y_i)$. If at least one of the first plurality of similarities is larger than or equal to the first preset value, the another orientation block will be abandoned. Clustering orientation blocks in the valid set $T(x_i,y_i)$ is finished until all the orientation blocks in the valid set $T(x_i,y_i)$ are selected to be put into the orientation block set $D(x_i,y_i)$ or to be abandoned.

For instance, as shown in FIG. 7, orientation block sets $D(-3,-3)$ and $D(3, 3)$ corresponding to position $(-3,-3)$ and position $(3, 3)$ respectively are obtained by clustering the valid sets $T(-3,-3)$ and $T(3,3)$ respectively.

With the device according to embodiments of the present disclosure, the candidate orientation block for each position of the reference coordinate system is obtained according to the similarities between each of the N initial orientation blocks and each orientation block in the N orientation block sets, and the compatibilities between two candidate orientation blocks corresponding to any two adjacent positions of the N positions, and thus a rational orientation field of the fingerprint is estimated by global optimization. In addition, with the device according to embodiments of the present disclosure, the orientation field is quantized, pre-knowledge regarding a fingerprint ridge is effectively applied to the estimation of orientation field of the fingerprint, an interference of a complicate background is greatly reduced, an efficiency of the fingerprint identification is increased, and an identification precision for a poor quality fingerprint is significantly improved.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions. This should be understood by those skilled in the art which embodiments of the present disclosure belong to.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment.

It is understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the phrases throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A computer-implemented method for estimating an orientation field of a fingerprint, comprising:

receiving a fingerprint to be estimated, obtaining an initial orientation field of the fingerprint to be estimated, and putting the initial orientation field in a reference coordinate system;

obtaining N initial orientation blocks corresponding to the initial orientation field, in which the N initial orientation blocks correspond to N positions of the initial orientation field in the reference coordinate system respectively, and obtaining N orientation block sets corresponding to the N positions respectively from a fingerprint dictionary, in which the fingerprint dictionary comprises M orientation block sets corresponding to M positions in the reference coordinate system, and each of the M orientation block sets comprises a plurality of orientation blocks corresponding to a plurality of training fingerprints in one position of the M positions respectively and in which N≤M;

obtaining a similarity between each of the N initial orientation blocks and each orientation block in the N orientation block sets corresponding to the N positions to obtain P similarities, and selecting a preset number of candidate orientation blocks for each of the N positions from the orientation block set according to the P similarities;

obtaining a compatibility between two candidate orientation blocks corresponding to any two adjacent positions of the N positions respectively to obtain a plurality of compatibilities; and obtaining a candidate orientation block for each position from the preset number of candidate orientation blocks according to the P similarities and the plurality of compatibilities, and generating an orientation field of the fingerprint to be estimated according to the candidate orientation block for each position.

2. The method according to claim 1, wherein the fingerprint dictionary is established by:

obtaining P training orientation fields corresponding to P training fingerprints respectively, and calibrating P reference points corresponding to the P training orientation fields respectively and P reference directions corresponding to the P training orientation fields respectively;

adjusting the P training orientation fields to the reference coordinate system according to the P reference points and the P reference directions respectively, and obtaining P reference orientation fields corresponding to the P training fingerprints respectively; and obtaining the M orientation block sets according to the P reference orientation fields to establish the fingerprint dictionary.

3. The method according to claim 2, wherein obtaining the M orientation block sets according to the P reference orientation fields comprises:

obtaining a first preset size orientation block corresponding to a position $(x_i,y_i)$ in each of the P reference orientation fields;

judging whether the first preset size orientation block is in a valid region;

if yes, putting the first preset size orientation block into a valid set $T(x_i,y_i)$ corresponding to the position $(x_i,y_i)$; and obtaining an orientation block set $D(x_i,y_i)$ corresponding to the position $(x_i,y_i)$ by clustering orientation blocks in the valid set $T(x_i,y_i)$.

4. The method according to claim 3, wherein clustering orientation blocks in the valid set $T(x_i,y_i)$ comprises:

a. putting any orientation block of the valid set $T(x_i,y_i)$ into the orientation block set $D(x_i,y_i)$;
b. selecting another orientation block from the valid set $T(x_i,y_i)$, and obtaining a similarity between the another orientation block and each orientation block of the orientation block set $D(x_i,y_i)$ to obtain a first plurality of similarities;
c. if each of the first plurality of similarities is less than a first preset value, putting the another orientation block into the orientation block set $D(x_i,y_i)$;
d. if at least one of the first plurality of similarities is larger than or equal to the first preset value, abandoning the another orientation block; and
e. repeating step b to d until all the orientation blocks of the valid set $T(x_i,y_i)$ have been selected.

5. The method according to claim 4, wherein selecting preset number of candidate orientation blocks for each of the N positions from the orientation block set corresponding to the initial orientation block according to the P similarities comprises:

f. obtaining an orientation block queue by sorting orientation blocks of the orientation block set $D(x_i,y_i)$ according to similarities corresponding to the orientation blocks of the orientation block set $D(x_i,y_i)$, obtaining a maximum similarity of the similarities, and putting the orientation block corresponding to the maximum similarity into a candidate orientation block set;
g. selecting an orientation block subsequent to the orientation block put into the candidate orientation block set from the orientation block queue, and obtaining a similarity between the orientation block subsequent to the orientation block put into the candidate orientation block set and each orientation block in the candidate orientation block set to obtain a second plurality of similarities;
h. if each of the second plurality of similarities is less than a second preset value, putting the orientation block subsequent to the orientation block put into the candidate orientation block set into the candidate orientation block set;
i. if at least one of the second plurality of similarities is larger than or equal to the second preset value, abandoning the orientation block subsequent to the orientation block put into the candidate orientation block set; and
j. repeating step g to i until a number of the candidate orientation blocks in the candidate orientation block set is a preset number.

6. The method according to claim 1, wherein obtaining the initial orientation field of the fingerprint to be estimated comprises:

obtaining a foreground image of the fingerprint to be estimated;

dividing the foreground image into a plurality of non-overlapping and second preset size image blocks;

applying two-dimensional short-time Fourier transform to each of the plurality of non-overlapping and second preset size image blocks, and obtaining a plurality of response directions corresponding to the plurality of non-overlapping and second preset size image blocks respectively;

establishing a foreground orientation field of the fingerprint to be estimated according to the plurality of response directions; and generating the initial orientation field of the fingerprint to be estimated by adjusting the foreground orientation field according to an adjusting algorithm for fingerprint attitude.

7. The method according to claim 1, wherein obtaining the candidate orientation block for each position from the preset number of candidate orientation blocks according to the P similarities and the plurality of compatibilities comprises:
establishing an objective optimization function according to the P similarities and the plurality of compatibilities, and obtaining the candidate orientation block for each position by optimizing the objective optimization function, in which the objective optimization function is:

$$\min E(r) = \min\left(\sum_{i \in V}(1 - S(\Theta_i, \Phi_{i,r_i})) + w_c \sum_{(i,j) \in N}\left(1 - C(\Phi_{i,r_i}, \Phi_{j,r_j})\right)\right),$$

in which, V is the initial orientation field, i represents a position $(x_i, y_i)$ in the initial orientation field V, $\Theta_i$ is an initial orientation block corresponding to the position $(x_i, y_i)$, $\Phi_{i,r_i}$ is an $r_i^{th}$ candidate orientation block corresponding to the position $(x_i, y_i)$, $S(\Theta_i, \Phi_{i,r_i})$ is a similarity between the initial orientation block $\Theta_i$ and the candidate orientation block $\Phi_{i,r_i}$, N is a set of four-connected adjacent initial orientation blocks, $\Phi_{j,r_j}$ is an $r_j^{th}$ candidate orientation block corresponding to a position $(x_j, y_j)$ adjacent to the position $(x_i, y_i)$, $C(\Phi_{i,r_i}, \Phi_{j,r_j})$ is a compatibility between the candidate orientation block $\Phi_{i,r_i}$ and the candidate orientation block $\Phi_{j,r_j}$, $w_c$ is a preset weight.

8. The method according to claim 7, wherein the objective optimization function is optimized according to Graph Cut or confidence transmission method.

9. A device for estimating an orientation field of a fingerprint, comprising:
a processor; and
a memory, configured to store instructions executable by the processor,
wherein the processor is configured to:
receive a fingerprint to be estimated, obtain an initial orientation field of the fingerprint to be estimated, and put the initial orientation field in a reference coordinate system;
obtain N initial orientation blocks corresponding to the initial orientation field, in which the N initial orientation blocks correspond to N positions of the initial orientation field in the reference coordinate system respectively, and obtain N orientation block sets corresponding to the N positions respectively from a fingerprint dictionary, in which the fingerprint dictionary comprises M orientation block sets corresponding to M positions in the reference coordinate system, and each of the M orientation block sets comprises a plurality of orientation blocks corresponding to a plurality of training fingerprints in one position of the M positions respectively and in which N≤M;
obtain a similarity between each of the N initial orientation blocks and each orientation block in the N orientation block sets corresponding to the N positions to obtain P similarities, and select a preset number of candidate orientation blocks for each of the N positions from the orientation block set according to the P similarities;

obtain a compatibility between two candidate orientation blocks corresponding to any two adjacent positions of the N positions respectively to obtain a plurality of compatibilities; and
obtain a candidate orientation block for each position from the preset number of candidate orientation blocks according to the P similarities and the plurality of compatibilities, and generate an orientation field of the fingerprint to be estimated according to the candidate orientation block for each position.

10. The device according to claim 9, wherein the processor is further configured to establish the fingerprint dictionary, comprising:
obtaining P training orientation fields corresponding to P training fingerprints respectively, and calibrating P reference points corresponding to the P training orientation fields respectively and P reference directions corresponding to the P training orientation fields respectively;
adjusting the P training orientation fields to the reference coordinate system according to the P reference points and the P reference directions respectively, and obtaining P reference orientation fields corresponding to the P training fingerprints respectively; and
obtaining the M orientation block sets according to the P reference orientation fields to establish the fingerprint dictionary.

11. The device according to claim 10, wherein the processor is configured to:
obtain a first preset size orientation block corresponding to a position $(x_i, y_i)$ in each of the P reference orientation fields;
judge whether the first preset size orientation block is in a valid region;
if yes, put the first preset size orientation block into a valid set $T(x_i, y_i)$ corresponding to the position $(x_i, y_i)$; and
obtain an orientation block set $D(x_i, y_i)$ corresponding to the position $(x_i, y_i)$ by clustering orientation blocks in the valid set $T(x_i, y_i)$.

12. The device according to claim 11, wherein clustering orientation blocks in the valid set $T(x_i, y_i)$ comprises:
a. putting any orientation block of the valid set $T(x_i, y_i)$ into the orientation block set $D(x_i, y_i)$;
b. selecting another orientation block from the valid set $T(x_i, y_i)$, and obtaining a similarity between the another orientation block and each orientation block of the orientation block set $D(x_i, y_i)$ to obtain a first plurality of similarities;
c. if each of the first plurality of similarities is less than a first preset value, putting the another orientation block into the orientation block set $D(x_i, y_i)$;
d. if at least one of the first plurality of similarities is larger than or equal to the first preset value, abandoning the another orientation block; and
e. repeating step b to d until all the orientation blocks of the valid set $T(x_i, y_i)$ have been selected.

13. The device according to claim 12, wherein the processor is configured to:
f. obtain an orientation block queue by sorting orientation blocks of the orientation block set $D(x_i, y_i)$ according to similarities corresponding to the orientation blocks of the orientation block set $D(x_i, y_i)$, obtain a maximum similarity of the similarities, and put the orientation block corresponding to the maximum similarity into a candidate orientation block set;
g. select an orientation block subsequent to the orientation block put into the candidate orientation block set from the orientation block queue and obtain a similarity between the orientation block subsequent to the orientation block put into the candidate orientation block set and each orientation block in the candidate orientation block set to obtain a second plurality of similarities;

h. if each of the second plurality of similarities is less than a second preset value, put the orientation block subsequent to the orientation block put into the candidate orientation block set into the candidate orientation block set;

i. if at least one of the second plurality of similarities is larger than or equal to the second preset value, abandon the orientation block subsequent to the orientation block put into the candidate orientation block set; and j. repeat step g to i until a number of the candidate orientation blocks in the candidate orientation block set is a preset number.

14. The device according to claim 9, wherein the processor is configured to:

obtain a foreground image of the fingerprint to be estimated;

divide the foreground image into a plurality of non-overlapping and second preset size image blocks;

apply two-dimensional short-time Fourier transform to each of the plurality of non-overlapping and second preset size image blocks, and obtain a plurality of response directions corresponding to the plurality of non-overlapping and second preset size image blocks respectively;

establish a foreground orientation field of the fingerprint to be estimated according to the plurality of response directions; and generate the initial orientation field of the fingerprint to be estimated by adjusting the foreground orientation field according to an adjusting algorithm for fingerprint attitude.

15. The device according to claim 9, wherein the processor is configured to establish an objective optimization function according to the P similarities and the plurality of compatibilities, and to obtain the candidate orientation block for each position by optimizing the objective optimization function, in which the objective optimization function is:

$$\min E(r) = \min\left(\sum_{i \in V} (1 - S(\Theta_i, \Phi_{i,r_i})) + w_c \sum_{(i,j) \in N} (1 - C(\Phi_{i,r_i}, \Phi_{j,r_j}))\right),$$

in which, V is the initial orientation field, i is a position $(x_i, y_i)$ in the initial orientation field V, $\Theta_i$ is an initial orientation block corresponding to the position $(x_i, y_i)$, $\Phi_{i,r_i}$ is an $r_i^{th}$ candidate orientation block corresponding to the position $(x_i, y_i)$, $S(\Theta_i, \Phi_{i,r_i})$ is a similarity between the initial orientation block $\Theta_i$ and the candidate orientation block $\Phi_{i,r_i}$, N is a set of four-connected adjacent initial orientation blocks, $\Phi_{j,r_j}$ is an $r_j^{th}$ candidate orientation block corresponding to a position $(x_j, y_j)$ adjacent to the position $(x_i, y_i)$, $C(\Phi_{i,r_i}, \Phi_{j,r_j})$ is a compatibility between the candidate orientation block $\Phi_{i,r_i}$ and the candidate orientation block $\Phi_{j,r_j}$, $w_c$ is a preset weight.

16. The device according to claim 15, wherein the objective optimization function is optimized according to Graph Cut or confidence transmission method.

* * * * *